United States Patent [19]

Baker

[11] 4,071,208

[45] Jan. 31, 1978

[54] MECHANICAL MIXER FOR CONTROLLING AIRCRAFT SPOILERS

[75] Inventor: Thomas M. Baker, Renton, Wash.

[73] Assignee: The Boeing Company, Seattle, Wash.

[21] Appl. No.: 723,014

[22] Filed: Sept. 13, 1976

[51] Int. Cl.² .............................................. B64C 13/32
[52] U.S. Cl. .................................. 244/83 G; 74/471 R; 74/480 R; 74/568 R; 244/213
[58] Field of Search ................ 244/83 G, 83 K, 42 D, 244/75 R, 213, 90 A; 74/480 R, 471 R, 471 XY, 567, 568 R, 569; 416/40

[56] References Cited

U.S. PATENT DOCUMENTS

| 1,592,740 | 7/1926 | MacNeil | 74/471 XY X |
|---|---|---|---|
| 2,514,459 | 7/1950 | Stalker | 416/40 |
| 2,736,519 | 2/1956 | Glenn | 74/471 R X |
| 2,872,151 | 2/1959 | Martin | 74/471 XY X |
| 2,962,911 | 12/1960 | Perkey et al. | 74/567 X |
| 3,006,205 | 10/1961 | Platt | 74/568 R X |
| 3,128,635 | 4/1964 | Doolittle | 74/471 R |
| 3,166,272 | 1/1965 | Liddell et al. | 244/83 K |
| 3,524,088 | 8/1970 | Ryckman | 74/569 X |
| 3,724,282 | 4/1973 | Daman | 74/567 X |
| 3,729,272 | 4/1973 | Lemont | 74/567 X |
| 3,774,869 | 11/1973 | Harmon | 74/567 X |
| 3,789,692 | 2/1974 | Farr et al. | 74/480 R |

Primary Examiner—Barry L. Kelmachter
Attorney, Agent, or Firm—Christensen, O'Connor, Garrison & Havelka

[57] ABSTRACT

In a system for positioning the spoilers on the port and starboard wings of an aircraft, a mechanical mixer that incorporates a three-dimensional cam receives pilot-controlled roll (control wheel) and speed-brake inputs and combines them to produce left and right wing spoiler positioning outputs. The cam surfaces of the three-dimensional cam are contoured so that the positioning of the spoilers in reaction to the roll input effects a roll response of the aircraft that is substantially independent of the setting of the speed-brake input.

10 Claims, 6 Drawing Figures

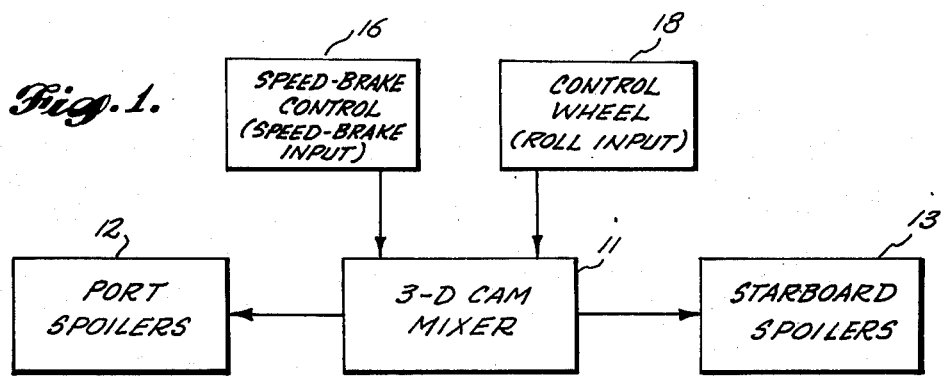
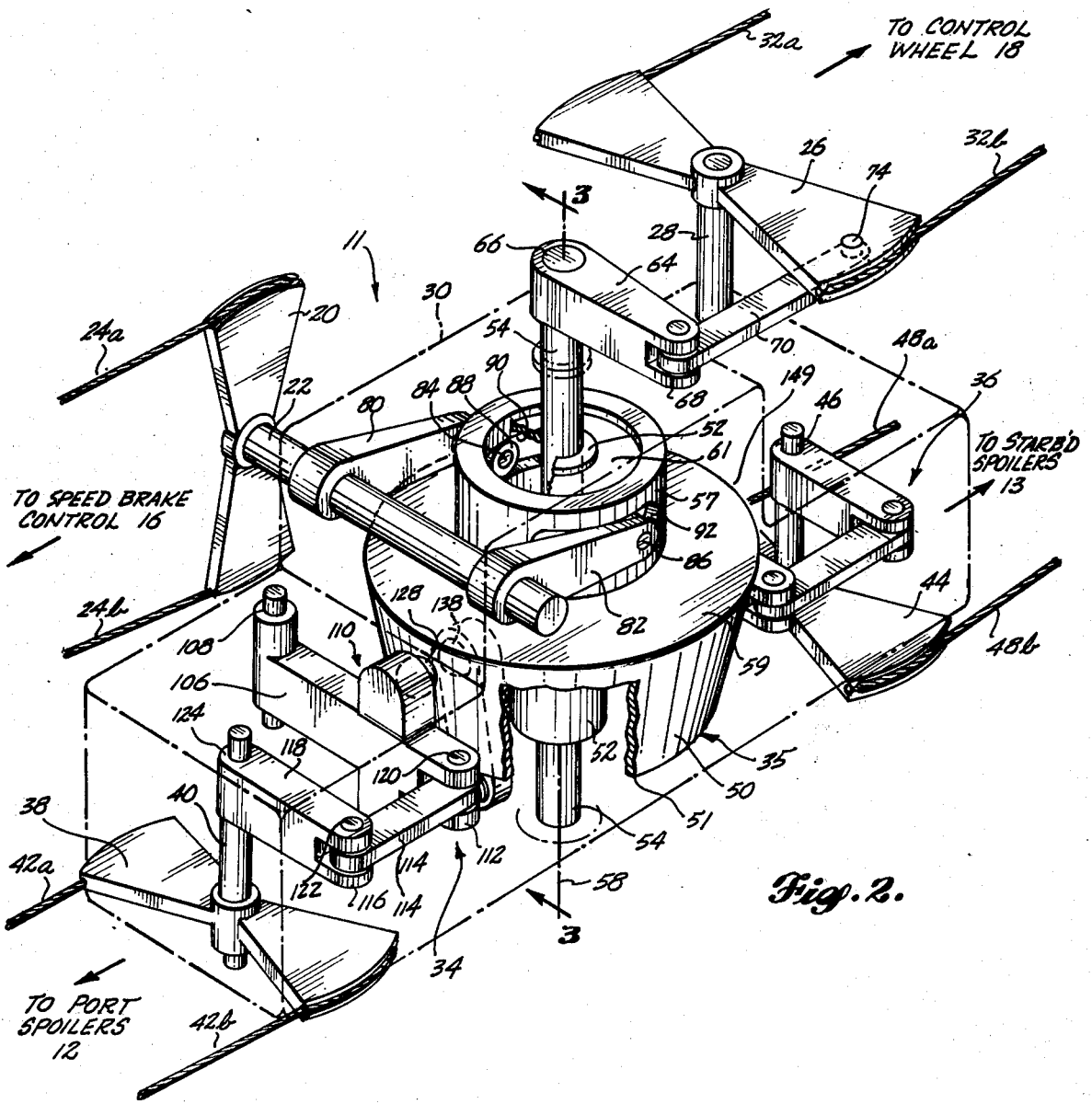

MECHANICAL MIXER FOR CONTROLLING AIRCRAFT SPOILERS

BACKGROUND OF THE INVENTION

The invention relates to an apparatus for positioning movable aerodynamic control surfaces on the wings of an aircraft in response to operation of both a pilot-controlled roll input (produced by turning the control wheel) and a pilot-controlled speed-brake input (produced by operating a lever located near the control wheel). While the invention is described herein in relation to its use for controlling the positions of spoilers (i.e., moveable aerodynamic control surfaces located on the upper surfaces of the wings of an aircraft), it will be apparent that the invention may also be used for controlling the positions of other types of aerodynamic control surfaces.

Devices for positioning wing mounted aerodynamic control surfaces in response to two or more pilot control inputs are general known and are sometimes referred to as "mechanical mixers". The roll and speed-brake inputs are typically applied to the mixer via control cables that are movable in response to the control wheel and the speed-brake lever, respectively. Controlled movements of the cables selectively displace a series of interconnected shafts, cranks cams and levers that comprise the mixer and that mechanically combine the inputs and produce a pair of related outputs, one for each wing. The outputs are in turn transmitted via control cables to hydraulic servomechanisms which force the spoilers to positions determined by the combined inputs.

Proper positioning of the spoilers must take into account the following aerodynamic factors. When the spoilers are raised by equal increments in response to the speed-brake, the drag on both wings is increased equally thereby providing control over the air speed without producing roll of the aircraft. When the spoilers are deployed by unequal increments in response to the lateral input derived from the control wheel, the spoilers act like ailerons to produce roll of the aircraft. Such unequal deployment occurs substantially in concert with movement of the ailerons and augments the roll response obtained by the ailerons. In some flight maneuvers, the control wheel and speed-brake are used separately and in such case the spoilers are responsive to only one of these controls at any given time. On the other hand, many flight conditions require concurrent use of both these controls so that the pilot can both control the air speed and perform roll manuevers. Known mechanical mixers are in general capable of combining these controls to position the spoilers in a manner that enables such concurrent use. However, with such known devices the pilot must carefully compensate for certain variations in the aircraft's aerodynamic response to one control depending on the setting of the other control.

Specifically, these variations which the pilot must compensate for can be best visualized by considering the following flight conditions. The first such condition is with the aircraft in level flight and the speed-brake lever set to zero so that the spoilers are fully retracted (i.e. in the down position flush with the upper surfaces to the wings). To bank the aircraft, the pilot turns the control wheel (either clock-wise or counter-clockwise from a zero degree roll position), causing the ailerons and spoilers on one wing to be raised. On the other wing the ailerons are lowered, but because the spoilers on such other wing are already fully retracted they cannot be further lowered and thus they merely remain in the down position. The wing having the raised spoilers (and raised ailerons) will incur increased drag and consequent loss in lift, thereby causing it to drop. Conversely, the lift on the opposite wing is increased by the lowered aileron (the spoiler in this case being retracted and thus not affecting lift). The aircraft now goes into a roll at a rate that is a function of the degree of deployment of the spoilers and ailerons. It is noted that the diminished lift of the first mentioned wing is due to the combined effects of both the raised ailerons and the raised spoilers whereas the enhanced lift of the latter wing is due solely to the lowered ailerons. A corresponding aerodynamic response occurs when the speed-brake is at maximum and the control wheel is turned to effect a lowering of both the spoilers and ailerons on one wing. Which together enhance the lift of that wing, while the spoilers on the other wing are at maximum deployment and cannot be further elevated and thus remain fixed so that the diminished lift on such other wing is due solely to the ailerons.

Now in comparison, consider the aircraft, again in level flight, but with the speed-brake input at an intermediate setting such that the spoilers on both wings are partially raised. As such, the spoilers on both wings are capable of either being raised or lowered in response to the control wheel. When the control wheel is turned in one or the other direction, a differential displacement of the spoilers occurs, in concert with the differential displacement of the ailerons, raising them on one wing and lowering them on the other. Because of the differential displacement of the spoilers, the roll response of the aircraft is significantly accentuated relative to the above-described response when the spoilers on only one wing are displaced. Thus, the same increment of control wheel rotation will produce a much sharper roll rate than in the above-described case. Because the pilot must compensate for the change in response that exists between the unilateral and differential displacement of the spoilers, depending on the setting of the speed-brake, control of the aircraft is not as precise as it could be if the roll response of the aircraft were the same or substantially the same for all settings of speed-brake.

To a certain extent the foregoing problem has been alleviated through the use of a variable-length, lever mechanism called a ratio-changer, that coacts with a mechanical mixer to vary the response of the mixer to the roll input as the speed-brake input changes. The ratio-changer thereby attenuates the responsiveness of the output of the mixer to the roll input to roughly compensat for the increased roll sensitivity that occurs when the spoilers are at an intermediate deployment and are capable of being differentially displaced as described above. Because of inherent limitations in the design of the existing ratio-changer and in the manner in which it cooperates with the mixer, such a device is capable of only partially compensating for the change in roll response that accompanies different speed-brake settings.

An example of an existing mixer of the type suitable for being equipped with a ratio-changer is found in the spoiler control system used on the Model 727 aircraft manufactured by The Boeing Company of Seattle, Washington. The mixer portion of such system is disclosed In U.S. Pat. No. 3,166,272, issued to M. S. Liddell et al. on Jan. 19, 1965. As illustrated in the mentioned patent the mixing function is peformed by the combination of a two-dimensional cam having a pair of followers cooperating therewith, and a series of follower arms and interconnecting linkages that cooperate to mix the roll and speed-brake inputs to produce two related outputs that control the position of the spoilers on the opposed wings. The aforementioned patent does not however disclose the above-described ratio-changer.

Accordingly, one object of the present invention is to provide an apparatus for disposing the spoilers of an aircraft in predetermined positions of deployment in response to any pilot-selected combination of roll and speed-brake inputs. A related and particular object of the invention is to provide such an apparatus capable of combining such inputs so that the roll response of the aircraft to the pilot-operated control wheel is substantially independent of the speed-brake input.

SUMMARY OF THE INVENTION

These and other objects of the invention are achieved by an improved mixer apparatus, employing a three-dimensional cam mechanism that is formed with cam surfaces contoured to position aerodynamic control surfaces, such as spoilers, on the port and starboard wings in response to any combination of first and second pilot-controlled inputs, such as speed-brake and roll inputs, respectively. First and second three-dimensional cam surfaces are defined on a cam and the cam is movably mounted on a support for translation along and rotation about a predetermined axis. First and second cam followers are also movably mounted on the support so as to be separately cammed by the first and second cam surfaces, respectively. The port and starboard control surfaces are coupled to the first and second followers, respectively, and are displaced to predetermined positions of deployment in reaction to movement of the followers as determined by the first and second cam surfaces. The cam is translated in response to the first input so as to vary the profiles of the cam surfaces that are followed by the followers when the cam is rotated in response to the second input. The cam surfaces are so contoured that the variations in the mentioned profiles cause the positioning of the aerodynamic control surfaces in response to the second pilot-controlled input to be varied in a predetermined manner in response to the first pilot-controlled input.

In a preferred form of the invention, the control surfaces are the port and starboard spoilers and the first and second inputs are the speed-brake and roll inputs, respectively. In such case, the first and second three-dimensional cam surfaces on the cam are contoured to obtain a change in rate of roll of the aircraft in response to an increment of roll input that is substantially independent of the setting of the speed-brake input. As a result of this feature, it is easier for the pilot to control the roll of the aircraft with the control wheel because he does not have to compensate for the particular setting of the speed brake.

The cam is preferably drum-shaped. A circumferentially extending wall of the cam is contoured to define the first and second cam surfaces which vary in radial distance from the axis of the cam. The followers are disposed at circumferentially spaced apart positions relative to the wall of the cam and are displaced radially toward and away from the cam axis as the radial distances of the cam surfaces that are in contact with the followers change in reaction to translation and rotation of the cam. The contouring of the first and second cam surfaces are alike but their orientations on the cam wall are circumferentially reversed with respect to one another so that the positioning of the spoilers in response to a first direction of cam rotation is balanced by an equal but counter-positioning of the spoilers in response to the opposite direction of cam rotation so as to provide equal port and starboard roll response of the aircraft.

In particular, each cam surface is composed of a set of geometrically distinct contours including first and second contours that are segments of cylinders arranged generally coaxially with the axis of the cam. The first and second contours are of different radius and are circumferentially spaced apart. A third contour extends circumferentially between the first and second contours. The third contour intersects with the first contour along a first curved line of intersection that extends both circumferentially and axially on the cam surface and the third contour intersects with the second contour along a second curved line of intersection that extends both circumferentially and axially on the cam surface.

Also the drum-shaped cam is preferably hollow and open at one axial end. The opposite axial end is mounted with respect to the support in a manner that permits both translation and rotation of the cam. The first and second followers are each yoke-shaped with arms arranged to straddle the wall of the cam at its open end and to engage the exterior and interior wall surfaces so that each follower can be forced either radially outwardly or radially inwardly by translation and/or rotation of the cam. This capability is required so that the mixer can be operated to free a jam occurring in the spoiler control system downstream of the mixer.

These and further features, objects and advantages of the invention will become apparent to those skilled in the art from the following detailed description and appended drawings.

BRIEF DESCRIPTION OF THE DRAWINGS

FIG. 1 is a generalized block diagram of a spoiler control system incorporating the present invention.

FIG. 2 is an isometric view of the preferred embodiment of the mixer that is shown in block form in FIG. 1.

DESCRIPTION OF THE PREFERRED EMBODIMENT

Figure 3:
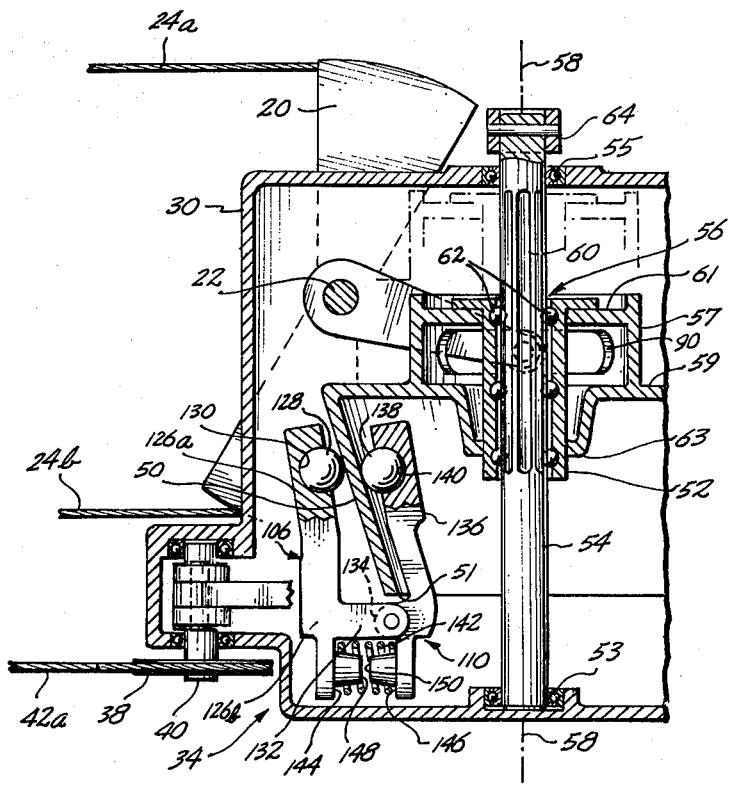
FIG. 3 is a vertical section view of the left-hand portion of the mixer as viewed in FIG. 2, taken generally along section line 3—3 therein.

With reference to FIGS. 1 and 2, the principles of the present invention are embodied in an improved mixer 11 for use in a spoiler control system in which port and starboard wing spoilers 12 and 13 respectively, are positioned in response to selectively variable settings of a speed-brake control 16 and a control wheel 18. Speed-brake control 16 is operated by the pilot and is effective to control deployment of the spoilers on both wings equally to increase drag and reduce lift and thereby reduce air speed without influencing the roll of the aircraft. Roll control 18 is operated by the pilot (or autopilot) and is effective to control deployment of the spoilers by unequal amounts, in concert with the ailerons, so as to aerodynamically increase the lift on one wing and decrease the lift on the opposite wing and to thus cause roll of the aircraft. Since the aerodynamic responses of the aircraft to the speed-brake control 16 and control wheel 18 are interdependent as previously described, a change in one affects the use of the other. Mixer 11 compensates for this interdependency and controls the port and starboard wing spoilers 12 and 13, respectively, in a manner that achieves a uniformity in the aircraft roll rate in response turning of the control wheel 18 that is substantially independent of the setting of the speed-brake control 16.

As shown in FIG. 2, the speed-brake input to mixer 11 is provided by an input crank 20 composed of diametrically opposed pie-shaped sections joined at a hub which is in turn keyed to one end of a horizontally disposed input shaft 22. Shaft 22 is journaled for rotation in a housing 30 (shown by broken lines in FIG. 2) so that crank 20 rotates in a vertical plane juxtaposed the housing. A pair of control cables 24a and 24b are connected to crank 20 for turning it and thus shaft 22 through a partial revolution in response to speed-brake control 16.

Similarly, the roll input to mixer 11 is via a crank 26, similar to crank 20, and keyed to an upper end of a vertically disposed shaft 28, which is in turn journaled for rotation in housing 30 so that crank 26 rotates in a horizontal plane lying above the upper extent of the housing. A pair of control cables 32a and 32b extending from the control wheel 18 are connected to crank 26 for turning it through a partial revolution. Alternatively, the roll input to mixer 11 can be derived from an auxiliary output of a hydraulic power unit that positions the ailerons in response to control wheel 18.

As described more fully herein, the speed-brake and roll inputs received by cranks 20 and 26 are respectively effective to translate and rotate a three-dimensional cam 35 which in turn acts through a pair of follower assemblies 34 and 36 to produce port and starboard spoiler positioning outputs for spoilers 12 and 13, respectively.

The output for the port spoiler is obtained from a crank 38 keyed to a lower end of a vertically disposed output shaft 40 which is journaled for rotation in housing 30 (see FIG. 3) and is responsive to follower assembly 34 as described more fully herein. Crank 38 is connected to a pair of control cables 42a and 42b that control the position of spoilers 12 in accordance with the angular orientation of shaft 40. Similarly, but on the other side of housing 30, a crank 44, shaft 46 and a pair of control cables 48a and 48b are mounted and arranged for positioning the right wing spoilers 13 in response to follower assembly 36.

Preferably cam 35 is hollow and open at an end 51 for cooperating with yoke like followers are described herein. For convenience the shape of cam 35 as it appears in FIGS. 2 and 3 is simplified so that its appearance is roughly drum-shaped. In actuality, and as described more fully herein in connection with FIG. 4, a circumferential cam wall 50 of cam 35 is contoured on its exterior and interior surfaces in a manner designed to position the spoilers to achieve a desired aerodynamic response of the aircraft to all combinations of speed-brake and roll inputs.

As shown in FIGS. 2 and 3, cam 35 has a hub 52 that is slidably and nonrotatably mounted on a vertically disposed shaft 54 by a ball spline 56 (FIG. 3). The upper and lower ends of shaft 54 are journaled for rotation in housing 30 by means of bearings 53 and 55, respectively, so that cam 35 is disposed on shaft 54 for rotation about a vertical axis 58, and ball spline 56 coacts with longitudinal grooves 60 (FIG. 3) provided on shaft 54 for sliding translation of cam 36 along axis 58. Wall 50 of cam 35 is supportively connected to hub 52 by a transversely disposed wall 59 that has an axial offset 63 with a centrally disposed opening therein. A cylindrical collar 57 is joined to the upper surface of wall 59 and supports therewithin another transversely extending wall 61 elevated from wall 59 and having a centrally located opening aligned with the opening in offset 63. Hub 52 is secured to wall 59 and offset 63 by suitable means such as welding.

Rotation of cam 35 is effected in response to roll control 18 by rotating shaft 54 via a crank arm 64 having a one end keyed to an upper end 66 of the shaft. The opposite end 68 of arm 64 is yoked and coupled to an end of link 70 by a pin 72 while the other end of link 70 is connected to a crank pin 74 carried by crank 26.

The speed-brake input from control 15 translates cam 35 along shaft 54, and for this purpose shaft 22 has keyed thereto a pair of axially spaced-apart, transversely extending crank arms 80 and 82 arranged to form a yoke that straddles collar 57. The free ends of arms 80 and 82 carry inwardly projecting studs 84 and 86 on each of which a roller is journaled, only one of which is visible in FIG. 2 as roller 88. Collar 57 has defined thereon a pair of diametrically opposed and circumferentially extending slots 90 and 92 that receive the rollers carried at the ends of arms 80 and 82 and transmit the cranking action of arms 80 and 82 into controlled translation of cam 35 along shaft 54. The circumferential extents of slots 90 and 92 are selected to allow cam 35 to freely rotate in response to an input from roll control 18, and also to accommodate movement of rollers 88 in the horizontal plane as arms 80 and 82 are rotated to raise and lower cam 35.

Follower assembly 34 controls the angular position of shaft 40 which in turn controls the port wing spoilers 12, while assembly 36 controls the angular position of shaft 46 for positioning the starboard wing spoilers 13. The follower assemblies 32 and 34 are identical except for the reverse mounting thereof as shown in FIG. 2, so only assembly 34 will be described in detail.

Assembly 34 includes a follower arm 106 having one end pivotally mounted on a vertically disposed pivot pin 108 supported by housing 30 at a location removed to one side of wall 50 of cam 35 so that arm 106 rotates in a horizontal plane with the free end thereof generally tangent to the exterior circumference of cam wall 50. A yoke-like subassembly 110 (see FIG. 3) is carried by arm 106 intermediate the ends thereof and at a position generally coinciding with the tangential intercept of arm 106 with the exterior circumference of cam wall 50. As described herein in connection with FIG. 3, subassembly 110 supports a pair of opposed spherical followers that rotatively ride on the exterior and interior surfaces of wall 50 and follow the contours thereon. Arm 106 is responsively caused to pivot in its horizontal plane of rotation as subassembly 110 moves radially toward and away from axis 58.

The end of arm 106 opposite pin 108 is yoked at 112 and is coupled by a link 114 to a yoked end 116 of a crank arm 118 by means of vertically disposed pivot pins 120 and 122, respectively. The opposite end 124 of crank arm 118 is keyed to shaft 40. Pivotal action of follower arm 106 in response to cam 50 is thus amplified by the multiplying effect of link 114 and crank arm 118 so that a relatively small amplitude displacement of arm 106 about pivot pin 108 is multiplied, by a factor based on the relatively shorter length of crank arm 118 compared to follower arm 106, to rotate shaft 40 and crank 38 through a substantially greater angle of rotation than exhibited by follower arm 106.

With reference to FIG. 3, yoke-like subassembly 110 includes a pair of yoke arms 126 and 136. Arm 126 is formed by portions 126a and 126b that are integral with arm 106 and project transversely therefrom, on the upper side and lower side thereof, respectively. Arm portion 126a supportively carries a spherical follower 128 oriented inwardly toward arm 136 for riding on the exterior circumference of cam wall 50. Spherical follower 128 may be provided by a metal ball rotatively retained in a socket 130 formed in portion 126a by well-known means, so that follower 128 is free to rotate as it rides on the cam. The lower arm portion 126b is formed with a horizontally disposed leg 132 that projects radially inwardly toward axis 58 of cam 35 and is pivotally joined at its terminus to a lug 134 formed on a lower end of arm 136.

Arms 136 and 126 (in the form of portions 126a and 126b) together define an upstanding yoke-like structure that straddles the open end of cam wall 50 and positions the upper end of arm portion 126a and the upper end of arm 136 for cooperating with the exterior and interior surfaces of wall 50, respectively. A spherical follower 138 is rotatively carried in a socket 140 that is provided in arm 136 adjacent its upper end and is oriented outwardly toward arm portion 126a for riding on the interior circumference of wall 50.

A helical compression spring 142 acts between inwardly opposed surfaces 144 and 146 of a lower end of arm portion 126b and a lower end of arm 136, respectively, lying below the horizontal plane of pivot 134 so that arm 136 is biased in a counterclockwise direction of rotation as it appears in FIG. 3. During normal cam operation, the bias effected by spring 142 holds followers 128 and 138 in positive contact with the exterior and interior surfaces of wall 50, respectively.

Mutually opposed stops 148 and 150 are provided on portion 126b and arm 136 adjacent ends 144 and 146, respectively, to limit the amount of separation permitted between the upper ends of arm portion 126a and arm 136. During normal operation, stops 148 and 150 are separated by a gap and arm 136 does not directly influence the movement of follower arm 106 but merely coacts with spring 142 and follower 138 to hold follower 128 of arm portion 126a in positive contact with the exterior surface of the cam. However, as described herein, under certain abnormal operating conditions, it is necessary to force subassembly 110 radially inwardly and in such case, stops 148 and 150 enable arm 136 to transmit a radially inwardly directed camming action to arm 106.

Follower assembly 36 is constructed of components identical to those described above in connection with follower assembly 34, and the yoke-like subassembly 149 of follower assembly 36, (only partially visible in FIG. 2) is disposed to straddle the wall 50 of cam 35 at a location diametrically opposed to the position of subassembly 110.

Figure 4:
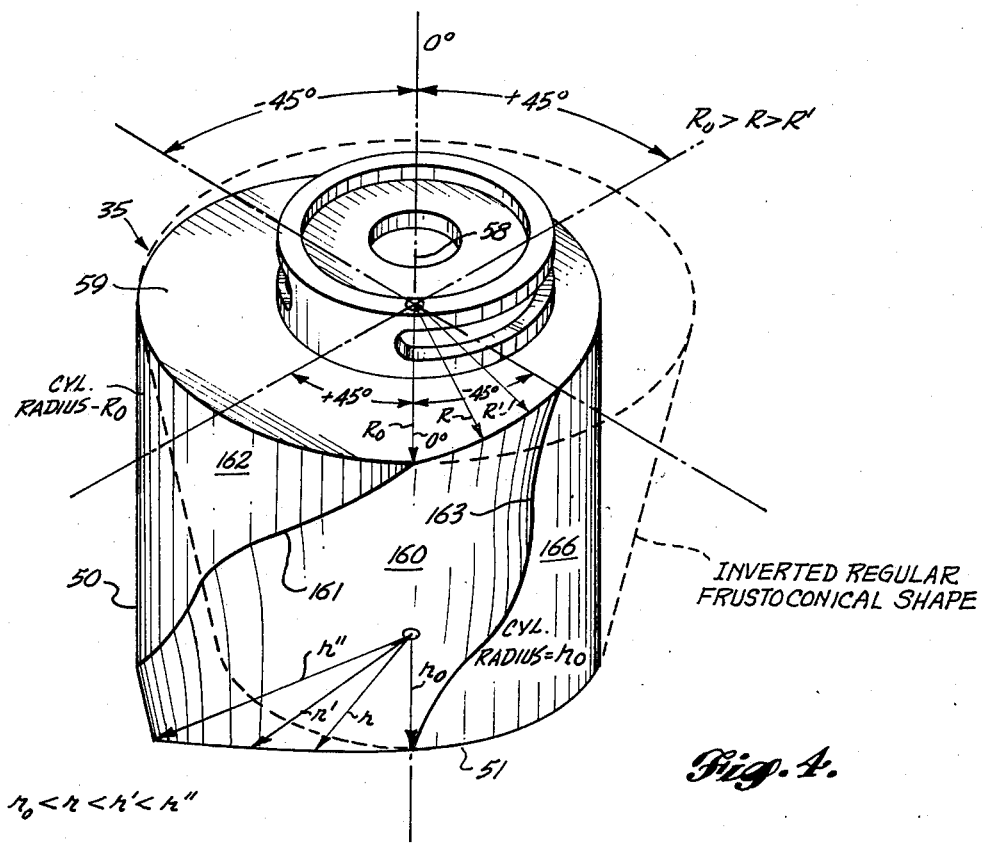
FIG. 4 is an isometric view of a three-dimensional cam used in the mixer shown in FIGS. 2 and 3.
Figure 5:
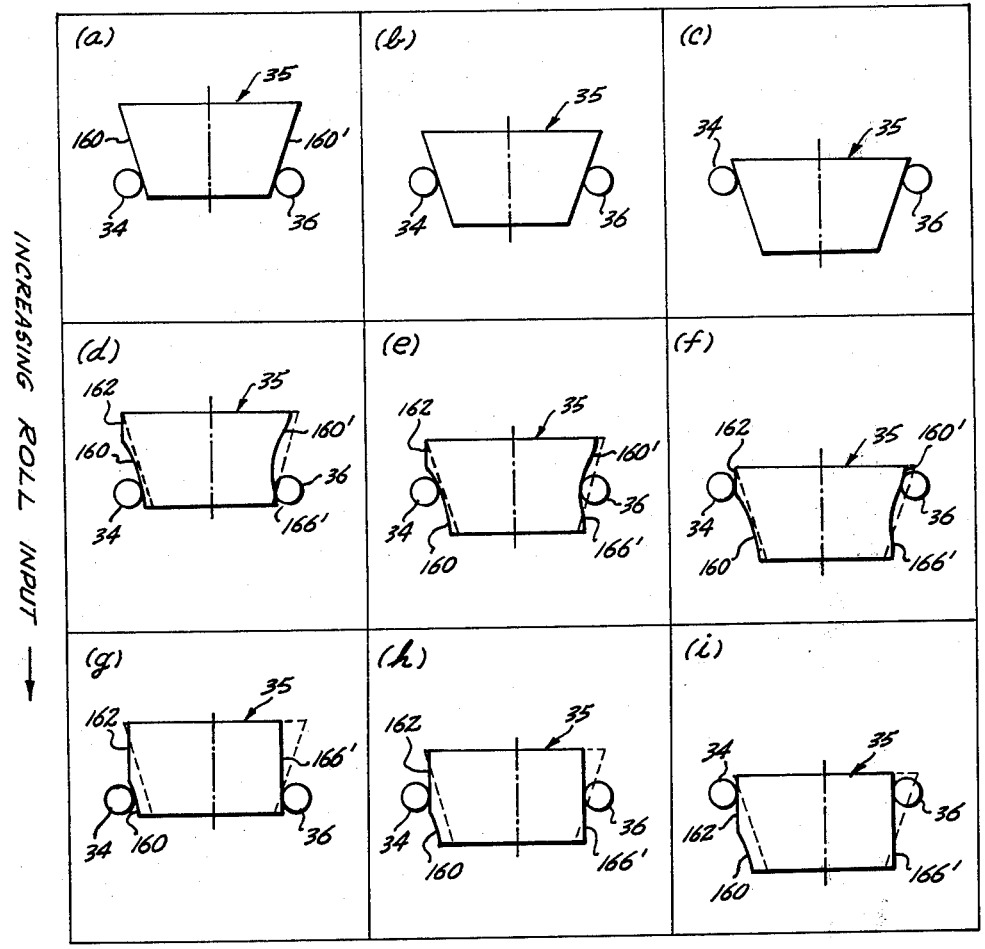
FIGS. 5a–i are a family of diagrams depicting in plan views the operation of the mixer under various input conditions.

With reference to FIGS. 4 and 5, cam 35 is in this embodiment forged as a unitary drum-shaped body on which two separate camming surfaces are machined. One of these surfaces is visible in the view of FIG. 4 and when the cam is mounted in housing 30 such surface coacts with follower assembly 34. The other surface is on the hidden side of cam 35 in FIG. 4 and it cooperates with follower assembly 36. Each such camming surface includes the section of the circumference of wall 50 bounded by the lower open end 51 and the upper closed end at wall 59 and by a circumferential sector embraced by ±45° in each direction from a circumferentially centermost position designated in FIG. 4 as 0°. The 0° position corresponds to a zero roll input and the ±45° limits represent the maximum roll inputs for port and starboard rolls. The camming surface for one follower assembly is like the surface for the other follower assembly except they are circumferentially reversed in orientation with respect to one another. Thus the camming surface on the hidden side of cam 35 in FIG. 4 is merely the mirror image (circumferentially reversed) of the visible surface.

As briefly described above, cam 35 is contoured to produce port and starboard spoiler positioning outputs that raise the spoilers on both wings, equally and in unison, in response to a speed-brake input, and that unequally deploy the spoilers in response to a roll input. Moreover, the outputs from mixer 11 must compensate for the above-described aerodynamic interrelationship between the speed-brake and roll control functions.

With reference to the camming surface of cam 35 that is visible in FIG. 4 (and which cooperates with follower assembly 34 when in housing 30), a set of three geometrically distinct contours is provided including contours 160, 162 and 166. Contour 162 is defined by a segment of a cylinder disposed coaxially with the cam axis 58 and oriented to the left-hand side of a 0° position at the circumferential center of the subject camming surface. When the roll input is zero, cam 35 assumes a rotational position that aligns this 0° position with follower assembly 34. In response to port and starboard roll inputs, cam 35 is rotatable counterclockwise (as viewed from the top of FIGS. 2, 3 and 4) to a plus 45° limit, and clockwise (again as viewed from the top of FIGS. 2, 3 and 4) to a minus 45° limit. Disposed on the right-hand side of this 0° position is a contour 166, also defined by a segment of a cylinder that is coaxial with axis 58, but having a radius $r_o$ that is less than the radius $R_o$ of contour 162. The third contour 160 is a segment of an inverted, irregular frustoconical-like shape that extends circumferentially between contours 162 and 166 and has a radius that in any given transverse plane increases in the circumferential direction from right to left. Moving circumferentially to the left of 0° the radius increases in a given transverse plane as represented by the progression $r_o$, $r$, $r'$ and $r''$. Moving circumferentially to the right of 0°, contour 166 decreases in a given transverse plane as represented by $R_o$, $R$, and $R'$. As a result, the radius of contour 160, at the 0° position of the camming surface, increases uniformly from bottom to top (like an inverted frustum) with the radius at the bottom equal to $r_o$ and the radius at the top equal to $R_o$. From the 0° position, contour 160 extends from right to left as viewed in FIG. 4 and intersects with cylindrical contour 162 along a skewed line of intersection 161 along which the varying radius of contour 160 equals the constant radius $R_o$ of contour 162. Line 161 thus defines a lower boundary of contour 162. Similarly, contour 160 extends from left to right as viewed in FIG. 4 to an intersection with cylindrical contour 166 along a skewed line of intersection 163 that defines an upper boundary of contour 166 and along which the varying radius of contour 160 equals the radius $r_o$ of contour 166.

In general, the increase in radius of contour 160 in the axial direction is effective to cam the follower assembly, in this instance assembly 34, outwardly with downward translation of cam 35 in housing 30 to raise the port spoilers in response to the speed-brake input. At the same time the corresponding, mirror image contour 160' on the reverse face of cam 35 (hidden in FIG. 4) cams follower assembly 36 to raise the starboard spoilers. For zero and maximum speed-brake settings, the axial lowermost and axial uppermost portions of contour 160 are in play to effect a unilateral displacment of the spoilers (on one wing only). The spoilers on the opposite wing are held stationary by the coaction of constant radius contours 166' or 162' with follower assembly 36. Since only one set of spoilers are moved in either of these two situations, the rate of change of the radius of contour 160 is selected to be at a maximum adjacent the axially lowermost and axially uppermost portions thereof. For intermediate speed-brake settings, at which both spoilers are capable of being displaced in the above-described differential operation, it is necessary to attenuate the rate of change of the radius of contour 160 in the circumferential direction to compensate for the increased roll response of the aircraft. For this purpose, the axially intermediate regions of contour 160 have a lesser rate of change of the radius in the circumferential direction.

The interior surface of wall 50 of the cam is provided with contours that generally match the exterior camming surfaces so that wall 50 is of substantially constant thickness. Since in this embodiment, the follower assemblies 34 and 36 track the exterior surface contours of wall 50 as described above, the interior surface contours need not be formed to the same degree of precision as the exterior contours.

The operation of cam 35 in mixer 11 is best understood by the family of diagrams shown in FIGS. 5(a)-(i) and in FIGS. 6(a)-(i). Reading left to right the rows of diagrams shown in the figures correspond to increasing levels of speed-brake input and thus show the translation of cam 35 relative to the followers (corresponding to follower 128 in FIG. 3) of assemblies 34 and 36. The columns, reading from top to bottom, depict increasing levels of roll input for one direction of roll, and thus correspond to increasing angles of rotation of cam 35 relative to a center position at which the followers of assemblies 34 and 36 are aligned with 0° on the cam circumference.

Figure 6:
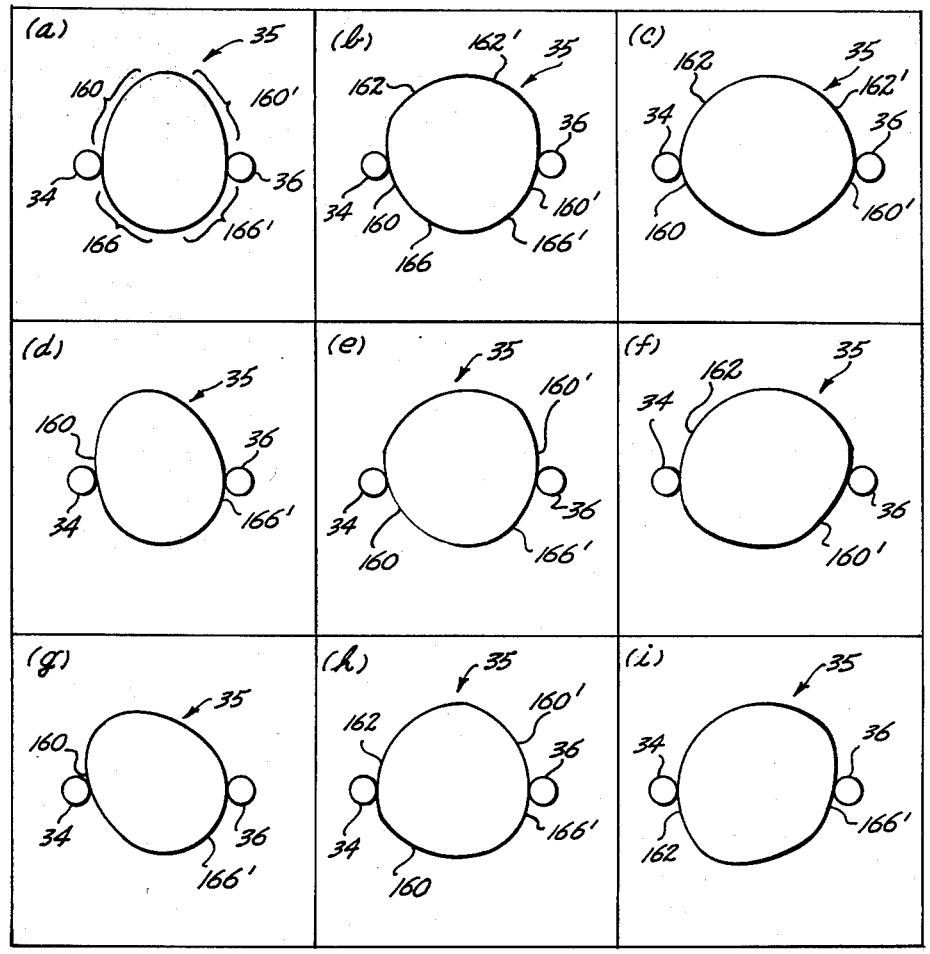
FIGS. 6a–i are a family of diagrams corresponding to FIGS. 5a–i, respectively, but depicting the mixer in horizontal sectional views.

Accordingly, diagram (a) of FIG. 5 shows cam 35 with zero speed-brake and zero roll with followers of assemblies 34 and 36 assuming a position near the lower end of the cam and at a circumferential location corresponding to 0° as shown in FIG. 4. FIG. 6(a) shows the profile of cam 35 in a transverse cutting plane for the same inputs (zero speed-brake and zero roll). With the roll input remaining at zero, an increase of the speed-brake input produces translation of cam 35 to the intermediate speed-brake level position shown in diagrams (b) of FIGS. 5 and 6. A maximum speed-brake input translates cam 35 to the position shown in diagrams (c) of FIGS. 5 and 6. It will be observed that with zero roll input, the followers of assemblies 34 and 36 are displaced radially outwardly, by uniformly increasing amounts, and in unison by the pitch of the conical-like contours at the 0° positions that define the centers of the diametrically opposed camming surfaces.

Starting with zero speed-brake input as shown in diagrams (a) of FIGS. 5 and 6, diagrams (d) and (g) of the same figures depict increasing amounts of roll input, in one direction thereof, that are effective to cause counterclockwise rotations of cam 35 (as it is viewed from the top of FIGS. 2 and 3). As indicated in diagrams (d), the follower of assembly 34 is displaced radially outwardly from the axis of cam 35 by the increasing radius of the contour 160 (see FIG. 4) to lift the port spoilers 12, while the follower of assembly 36 coacting with the camming region on the diametrically opposed side of cam 35, moves on to a cylindrical contour 166' of constant radius $r_o$ which is the mirror image of the cylindrical contour 166 shown in FIG. 4. During such rotation of cam 35 assembly 36 produces no net change in the output to starboard spoilers 13 since such spoilers are already fully retracted. Further increase in the roll input in the same direction rotates cam 35 to the position shown in diagrams (g) of FIGS. 5 and 6, in which the port spoilers 12 are raised still further in response to the increasing radius of contour 160, while the starboard spoilers 13 remain fixed because the follower of assembly 36 continues to trace the constant radius of cylindrical contour 166'.

Similarly, diagrams (e) of FIGS. 5 and 6 show the orientation of cam 35 relative to the followers of assemblies 34 and 36 for intermediate levels of roll and speed-brake inputs. In this case cam 35 has been translated so that the followers of assemblies 34 and 36 are at approximately mid-height of the cam and the cam has been rotated counterclockwise so that the follower of assembly 36 is approximately in the middle of contour 160 and the follower of assembly 36 is approximately at the middle of contour 160' (mirror image of contour 160 as viewed in FIG. 4. At these camming positions, rotation of cam 35 effects a differential raising and lowering of the port and starboard spoilers, respectively, but at a lesser rate of change as a function of cam rotation because of the above-described lesser change in radius of contours 160 and 160' for axially intermediate regions of these contours). Diagrams (f) of FIGS. 5 and 6 show the cam-to-follower relationship with maximum speed-brake input and an intermediate roll input; diagrams (h) shows the relationship for intermediate speed-brake with maximum roll input; and diagrams (i) shows the relationship for maximum speed-brake input and maximum roll input. It is noted in connection with the diagrams (f) and (i) that the follower of assembly 34 is in both cases, tracking the cylindrical contour 162, reflecting the fact that the port spoilers 12 are in their maximum raised position and cannot be further elevated. This operating mode is the complement of that shown in diagrams (d) and (g) in which the follower of assembly 36 therein is being held at a constant position by tracing cylindrical contour 166', reflecting the fact that the starboard spoilers 13 are in their fully retracted position and cannot be lowered further. This constant radius modes hold the associated spoilers at their limit position, without requiring any overrun capability in the hydraulic subsystems that are typically used to position the spoilers in response to the mixer outputs.

In the foregoing manner, mixer 11 functions to effect the proper amount of unequal deployment in the positioning of the port and starboard spoilers in response to the roll input to achieve an aerodynamic response of the aircraft that is substantially independent of the level of applied speed-brake. The contours of cam 35 shown and described herein, in general, provide the proper coordination between the port and starboard spoilers, the control wheel and the speed-brake for a typical commercial aircraft configuration, such as the Model 727 aircraft manufactured by The Boeing Company of Seattle, Wash. However, the particular aerodynamic control characteristics of the spoilers and their relationship with the ailerons will vary from aircraft to aircraft and therefore some reshaping of the contours on the cam may be desired to tailor the mixer to a particular type and model of aircraft. Such tailoring is performed empirically by trial and error by test flying the aircraft and thereafter reshaping the cam until optimum response performance is attained.

Mixer 11 in its preferred form can be operated under emergency conditions to free certain types of jams in the above-mentioned hydraulic subsystems (not shown) that control the position of the spoilers in response to the output cables 42a, 42b and 48a, 48b (FIG. 2). Such jams are caused by slivers of metal that become lodged in the valve mechanisms of the hydraulic subsystem, and it is necessary to force the jammed valve so as to sever the sliver of metal, and thereby free the jam. This is achieved in the present embodiment by the yoke-like subassemblies 110 and 149 and the provision of stops 148 and 150 thereon (FIG. 3) which limit the amount of separation between the arms of the yoke and thus allow a camming force to be applied to the interior arm 136 of subassembly 110 to draw the follower arm 106 radially inwardly in the event a jam occurs when the associated spoilers are elevated and arm 106 of assembly 34 is stuck in the radially outward position as shown in FIG. 3. The jam is freed by forcing the speed-brake input to zero to raise cam 35 in housing 30 until arm 136 is pivotally deflected in a clockwise rotation against the spring bias by an amount sufficient to move stop 150 into contact with stop 148. This limits further separation of the arm portions 126a and arm 136 and effects a direct mechanical linkage between follower 138 on arm 136 and follower arm 106. Further upward translation of cam 35 thus exerts a radially inward force on arm 106 that is transmitted downstream to free the jam in the hydraulic subsystem.

The foregoing is a description of one particular and preferred embodiment of the principles of the invention and is thus to be taken as illustrative of the invention rather as limiting. In this respect, numerous modifications to the foregoing disclosure may be made without departing from the spirit of the invention. For example, a cam 35 is shown and described above as having a circumferentially continuous wall on which the camming surfaces are formed. It will be recognized, however, that cam 35 is effective only on limited sectors of its full circumference, and the portions of the cam lying between these sectors may be formed in any shape or even removed if desired to define a split cam structure. While the follower assemblies are preferably disposed at diametrically opposed positions relative to the circumference of cam 35, this is not essential, and they may be located at any suitable angular separation about the circumference of the cam, with the camming regions being shifted correspondingly.

What is claimed is:

1. In an aircraft including first and second aerodynamic control surfaces arranged and movably mounted on the port and starboard wings, respectively, of such aircraft to function as spoilers, and a mixer apparatus for positioning said control surfaces in response to the combined settings of first and second, independently variable, pilot-controlled inputs, wherein said first input is a speed-brake setting and wherein the second input is a roll setting derived from the control wheel of the aircraft, said mixer apparatus comprising:

cam means defining first and second three-dimensional cam surfaces;

support means upon which said cam means is movably mounted;

means for translating said cam means relative to said support means along a predetermined axis in response to said first pilot-controlled input;

means for selectively rotating said cam means relative to said support means about said axis in response to said second pilot-controlled input;

first and second cam follower means mounted and arranged for movement relative to said support means, said first and second cam follower means cooperating with said first and second cam surfaces, respectively;

first and second coupling means coupling said first and second cam follower means to said first and second control surfaces, respectively; and said first and second cam surfaces being so contoured that translation of said cam means along said axis in response to said first input, as determined by the speed-brake setting, varies the profiles of said cam surfaces that are followed by said cam follower means when said cam means is rotated in response to said second pilot-controlled input, as determined by said roll setting, in such a manner that causes a rate of roll of the aircraft in response to an increment of the roll setting to be substantially independent of the speed-brake setting.

2. In the aircraft of claim 1, wherein said cam means comprises a generally drum-shaped member having a wall that circumferentially extends about said axis and defines thereon said first and second cam surfaces, said member being relatively movably mounted on said support means for translation along and rotation about said axis.

3. In the aircraft of claim 2, wherein said member is hollow and open at one axial end thereof and is supported at the opposite axial end for said translation and rotation, and wherein each of said first and second cam follower means comprise a follower assembly including a yoke-shaped structure that straddles said wall of said member at the open end thereof, a pair of followers carried by said yoke-shaped structure and held thereby in contact with the exterior and interior surfaces, respectively, of said wall.

4. In the aircraft of claim 3, wherein said cam surfaces are defined on the exterior surfaces of said wall of said drum-shaped member, and wherein each of said yoke-like structures includes a first arm carrying the one of said followers that is held in contact with the exterior surface of said wall and a second arm carrying the one of said followers that is held in contact with the interior surface of said wall, each said yoke-like structure including means for pivotally interconnecting said first and second arms at the joined ends thereof about an axis that is generally parallel to a tangent of said wall and means for resiliently urging the non-joined ends toward each other so as to hold said followers in intimate contact with said surfaces of said wall, said first arm of said yoke-like structure of said first follower means being connected to said first coupling means, and said first arm of said yoke-like structure of said second follower means being connected to said second coupling means.

5. The mixer apparatus of claim 4, wherein each of said yoke-like structures includes means for limiting the amount of separation between said non-joined ends of said first and second arms under the influence of a separating force that exceeds the force associated with said means for resiliently urging said second arm toward said first arm.

6. The mixer apparatus of claim 2, wherein said first and second cam surfaces are alike but are reversed circumferentially on said wall such that for a given setting of said speed-brake, a control wheel produced rotation of said cam means in a first direction from a predetermined zero degree rotational position causes a predetermined relative movement between said first and second control surfaces, and a control wheel produced rotation of said cam means in a second direction from said predetermined zero degree rotational position causes a relative movement between said first and second control surfaces that is equal and counter to said predetermined relative movement.

7. The mixer apparatus of claim 6 wherein each of said first and second cam surfaces comprises a first contour that is a segment of a cylinder and a second contour that is also a segment of a cylinder, said first and second contours having axes generally coaxial with said predetermined axis and being circumferentially spaced apart on said wall, said first contour having a predetermined radius and said second cylindrical contour having a predetermined radius that is greater than that of said first contour, and a conical-like contour having an axis also coaxial with said predetermined axis and circumferentially extending between said first and second contours, said conical-like contour having a radius that increases in a transverse plane as said conical-like contour extends circumferentially from an intersection with said first contour to an intersection with said second contour, said intersections being along lines of intersection that are skewed relative to said predetermined axis.

8. In an aircraft of the type having stationary port and starboard wings mounted on the fuselage and including first and second aerodynamic control surfaces mounted for movement on the port and starboard wings, respectively, and a mixer apparatus for positioning said control surfaces in response to the combined settings of first and second independently variable, pilot-controlled inputs, said mixer apparatus comprising:

cam means defining separate, first and second three-dimensional cam surfaces;

support means upon which said cam means is movably mounted;

first and second cam follower means mounted and arranged for movement relative to said support means, said first cam follower means cooperating only with said first cam surface, and said second cam follower means cooperating only with said second cam surface;

means for translating said cam means relative to said support means along a predetermined axis in response to said first pilot-controlled input;

means for selectively rotating said cam means relative to said support means about said axis in response to a change in the setting of said second pilot-controlled input so as to position said cam means at a pilot-selected angle of rotation with respect to said first and second cam follower means, said cam means remaining at said pilot-selected angle of rotation until altered in response to a change in the setting of said second pilot-controlled input;

first and second coupling means for coupling said first and second cam follower means to said first and second control surfaces, respectively; and said cam surfaces being so contoured that translation of said cam means along said axis varies the profiles of said cam surfaces that are followed by said cam follower means when said cam means is rotated such that the positioning of said control surfaces in response to said second pilot-controlled input varies as a predetermined function of said first pilot-controlled input.

9. In the aircraft of claim 8, wherein said control surfaces are spoilers and said first pilot-controlled input is a speed-brake setting and said second pilot-controlled input is a roll setting derived from the control wheel, and wherein said cam surfaces are contoured so that the roll rate of the aircraft in response to an increment of the setting of said second pilot-controlled input is substantially independent of the setting of said first pilot-controlled input.

10. In an aircraft including first and second aerodynamic control surfaces movably mounted on the port and starboard wings thereof, respectively, and a mixer apparatus for positioning said surfaces in response to the combined settings of first and second, separate and independently variable pilot-controlled inputs, said mixer apparatus comprising:

cam means defining first and second three-dimensional cam surfaces;

support means upon which said cam means is movably mounted;

means for translating said cam means relative to said support means along a predetermined axis in response to said first pilot-controlled input;

means for rotating said cam means relative to said support means about said axis in response to said second pilot-controlled input;

first and second cam follower means mounted on said support means for movement relative thereto and for separately cooperating with said first and second cam surfaces, respectively;

first and second coupling means coupling said first and second cam follower means to said first and second control surfaces, respectively; and said cam surfaces being so contoured that translation of said cam means along said axis varies the profiles of said cam surfaces that are followed by said cam follower means when said cam means is rotated such that the positioning of said control surfaces in response to said second pilot-control input varies as a predetermined function of said first pilot-control input.

* * * * *